(12) United States Patent
Smith et al.

(10) Patent No.: US 10,601,651 B2
(45) Date of Patent: *Mar. 24, 2020

(54) SYSTEM FOR DEPLOYMENT OF COMMUNICATION TERMINALS IN A CLOUD COMPUTING SYSTEM

(71) Applicant: Unify GmbH & Co. KG, Munich (DE)

(72) Inventors: James Smith, Nottingham (GB); Johann Zeiner, Karlsfeld (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,187

(22) Filed: Feb. 21, 2019

(65) Prior Publication Data
US 2019/0182112 A1   Jun. 13, 2019

Related U.S. Application Data (63) Continuation of application No. 15/819,526, filed on Nov. 21, 2017, now Pat. No. 10,257,034, which is a
(Continued)

(51) Int. Cl.
  *G06F 15/177* (2006.01)
  *H04L 12/24* (2006.01)
(Continued)

(52) U.S. Cl.
  CPC .......... *H04L 41/0806* (2013.01); *H04L 41/50* (2013.01); *H04L 67/2814* (2013.01); *G06F 9/44505* (2013.01)

(58) Field of Classification Search
  CPC .. H04L 41/0806; H04L 41/50; H04L 67/2814
(Continued)

(56) References Cited

U.S. PATENT DOCUMENTS

| | | |
|---|---|---|
| 2002/0138649 A1 | 9/2002 | Cartmell et al. |
| 2004/0196312 A1 | 10/2004 | Powers et al. |

(Continued)

FOREIGN PATENT DOCUMENTS

| | | |
|---|---|---|
| CN | 101304334 A | 11/2008 |
| CN | 102484836 A | 5/2012 |

(Continued)

OTHER PUBLICATIONS

Written Opinion of the International Searching Authority for PCT/EP2012/005392 dated Sep. 10, 2013 (Form PCT/ISA/237).
(Continued)

*Primary Examiner* — Liang Che A Wang
*Assistant Examiner* — Kaylee J Huang
(74) *Attorney, Agent, or Firm* — Buchanan Ingersoll & Rooney PC (57) ABSTRACT

A communication system includes a redirect server and a deployment server configured to configure different terminal devices so that those devices are able to access a network of a service provider. A terminal device, computer readable medium and method are also disclosed that helps deploy such a service. In one embodiment, a communication system is configured so that a user of a terminal is provided with a code. The code is then communicated to a redirect server via a terminal associated with the user. The redirect server utilizes the code to determine the address of a deployment sever. The redirect server then provides the address to the terminal so the terminal can connect to a configuration management system so that the terminal may communicate with that system to be configured for accessing the network services hosted by the system.

20 Claims, 6 Drawing Sheets

Related U.S. Application Data continuation of application No. 14/384,952, filed as application No. PCT/EP2012/005392 on Dec. 28, 2012, now Pat. No. 9,860,118.

(51) Int. Cl.
  *H04L 29/08* (2006.01)
  *G06F 9/445* (2018.01)

(58) Field of Classification Search
  USPC .......................................... 709/220, 222, 203
  See application file for complete search history.

(56) References Cited

U.S. PATENT DOCUMENTS

| | | | | |
|---|---|---|---|---|
| 2005/0159149 A1* | 7/2005 | Wen | ................. | H04L 29/12103 455/426.1 |
| 2007/0210917 A1 | 9/2007 | Collins, Jr. et al. | | |
| 2009/0158148 A1* | 6/2009 | Vellanki | .............. | H04L 41/0806 715/700 |
| 2010/0325406 A1 | 12/2010 | Ukeda et al. | | |
| 2011/0235085 A1 | 9/2011 | Jazayeri et al. | | |
| 2012/0089708 A1* | 4/2012 | Kim | ........................ | H04L 67/34 709/220 |

FOREIGN PATENT DOCUMENTS

| | | | | |
|---|---|---|---|---|
| EP | 2160041 A1 | | 3/2010 | |
| EP | 2528305 A1 * | | 11/2012 | ........... H04L 67/141 |
| EP | 2528305 A1 | | 11/2012 | |
| WO | 2014094297 A1 | | 6/2014 | |

OTHER PUBLICATIONS

International Search Report for PCT/EP2012/005392 dated Sep. 10, 2013 (Forms PCT/ISA/220, PCT/ISA/210).

\* cited by examiner

A terminal device receives a deployment code having a string of characters that may include symbols, numbers and letters. The deployment code has a first subpart identifying a count, a second subpart that identifies a redirection code, a third subpart that identifies a deployment reference and a fourth subpart that defines a validation value such as a checksum.

The terminal device sends a first message to a redirecting communication device that includes the deployment code or at least one subpart of the deployment code, such as the redirection code portion.

The redirecting communication device maps the redirection code component of the code to an address of the management device. A database may be searched to identify the address or the redirecting communication device can communicate with another device to obtain this address by sending that device a message along with the redirection code or a parameter derived from the redirection code to obtain the address.

The redirecting communication device sends a third message to the terminal device that includes the address of the management device.

The terminal device sends a fourth message to the management device based on the address received from the third message.

The management device and terminal device communicate so that the management device assigns a configuration for the terminal device such that the terminal device is able to communicate with and utilize services hosted by the management device or at least one server hosting a cloud service.

SYSTEM FOR DEPLOYMENT OF COMMUNICATION TERMINALS IN A CLOUD COMPUTING SYSTEM

CROSS-REFERENCE TO RELATED APPLICATIONS

This application is a continuation application of U.S. patent application Ser. No. 15/819,526, which is a continuation application of U.S. patent application Ser. No. 14/384,952, which is the United States national phase under 37 C.F.R. § 371 of PCT international application no. PCT/EP2012/005392, filed on Dec. 28, 2012.

BACKGROUND OF THE INVENTION

Field of the Invention

Embodiments relate to communication terminals, communication systems and methods of using such devices and systems. A non-transitory computer readable medium for deploying a communication service is also provided herewith that may be included within or connected to a communication terminal. In one embodiment, the method, system, terminal and computer readable medium is directed to a deployment of cloud services that can permit telephony cloud service providers to deploy such services in proficient and secure manner.

Background of the Related Art

Communication systems may be configured so that an enterprise such as a business maintains its own enterprise network. Other businesses may utilize a cloud service to receive network services. For instance, a cloud service provider may provide services to a customer so that an enterprise network or features of such a network no longer have to be directly maintained by the cloud service provider's customer.

Rolling out or deploying cloud service compliant devices, however, may be costly. One reason for the cost may be the expert manual interaction required at cloud service customer sites in order to prepare devices for access to cloud services. For instance, to utilize a cloud service, an enterprise may have to change a lot of communication infrastructure already in place or may need to make other changes to the types of terminal devices used by employees that are not compliant with the services offered by a cloud service provider. For instance, new or different computers, mobile telephones, or other terminal devices may be needed or software updates may be needed for pre-existing devices to address compliancy issues. Due to the expense or technical complications associated with such deployments, it can be difficult for a cloud service to be deployed.

BRIEF SUMMARY OF THE INVENTION

We have determined that a new method, system, terminal device, and computer readable medium is needed to better permit cloud service deployment. In one embodiment, a cloud telephony service deployment can be achieved or facilitated.

A communication system, terminal device, method, and non-transitory computer readable medium are provided that are directed to a deployment of one or more devices. An embodiment of the communication system may include a first terminal device, a redirecting communication device communicatively connectable to the first terminal device, and a management device that is communicatively connectable to the first terminal device. The first terminal device receives input indicating a deployment code for the first terminal device. The first terminal device determines the deployment code based upon the user input. The deployment code comprises a redirection code subpart. The first terminal device sends a first message to the redirecting communication device that comprises the redirection code subpart. In response to receiving the first message, the redirecting communication device determines an address of the management device that corresponds with the redirection code of the first message. The redirecting communication device sends a second message to the first terminal device that includes at least one of a language to be used by the first terminal device and the address of the management device. The first terminal device sends a third message to the management device via the address of the management device received from the second message. In response to the third message, the management device establishes a communication with the first terminal device to assign a configuration for the first terminal device. The configuration of the first terminal device is controlled by the management device.

In some embodiments of the system, the third message is comprised of a deployment reference subpart of the deployment code or a deployment reference portion of the deployment code. The configuration that is assigned to the first terminal device may be the configuration identified by the deployment reference subpart of the deployment code or the deployment reference portion of the deployment code. The deployment code may be comprised of a series of characters. The series of characters can comprise a plurality of subparts including a first subpart and a second subpart. The first subpart may be the redirection code subpart and the second subpart may be the deployment reference subpart. The deployment code may also be comprised of a third subpart that is a count. The count can identify a number of characters sequentially after a last character of the third subpart that defines the redirection code subpart. The deployment code can also include a fourth subpart that is a checksum. The checksum may be entered as part of a deployment code by a user of the first terminal device to validate the deployment code.

Embodiments of the system may also include a server hosting a cloud service. The server may be a computer device that hosts one or more cloud services, for example. The first terminal can form a communication connection with the server after having the configuration assigned by the management device and after the first terminal device is configured via the assigned configuration. In some embodiments of the system, the redirecting communication device may be in a first network, the first terminal device may be in a second network and the server and management device may in a third network. The redirecting communication device may be independent of the second and third networks.

A method of configuring a terminal device is also provided. The method may include the steps of a first terminal device receiving input indicating a deployment code for the first terminal device and the first terminal device determining the deployment code based upon the user input. The deployment code may include a redirection code subpart. The first terminal device sends a first message to a redirecting communication device. The first message includes the redirection code subpart. In response to receiving the first message, the redirecting communication device determines an address of the management device that corresponds with the redirection code of the first message. The redirecting communication device may send a second message to the first terminal device that includes at least one of a language to be used by the first terminal device and the address of the management device. The first terminal device sends a third message to a management device via the address of the management device received from the second message. The management device is associated with a network hosting at least one service. In response to the third message, the management device establishes a communication with the first terminal device to assign a configuration for the first terminal device. The configuration of the first terminal device may be controlled by the management device so that after the first terminal device is configured with the assigned configuration then at least one service is accessible to the first terminal device.

In some embodiments of the method, the third message is comprised of a deployment reference subpart of the deployment code or a deployment reference portion of the deployment code and wherein the configuration assigned to the first terminal device is the configuration identified by the deployment reference subpart of the deployment code or the deployment reference portion of the deployment code. The deployment code may also be comprised of a series of characters that include a plurality of subparts comprising a first subpart and a second subpart. The first subpart may be the redirection code subpart and the second subpart may be the deployment reference subpart or deployment reference portion of the deployment code. The deployment code may also be comprised of a third subpart that is a count that identifies a number of characters sequentially after a last character of the third subpart that defines the redirection code subpart. The deployment code may also be comprised of a fourth subpart that is a checksum.

The method may also include the steps of the first terminal device communicating with a server hosting a cloud service to receive the service after having the configuration assigned by the management device and after the first terminal device is configured in accordance with the assigned configuration. The redirecting communication device may be positioned independently of the network of the first terminal device and the network of the management device and the server. In some embodiments, the redirecting communication device is in a network that is remote form the other networks and is only communicatable with the other devices via an internet connection.

A communication terminal is also provided. The terminal includes a first transceiver unit, non-transitory memory having an application, and a processor unit communicatively connected to the first transceiver unit and the memory. The application is executable by the processor unit. The communication terminal performs a method defined by the application when the application is executed by the processor unit. The method defined by the application includes the communication terminal device receiving input indicating a deployment code for the communication terminal and the communication terminal determining the deployment code based upon the user input. The deployment code comprises a redirection code subpart. The communication terminal sends a first message comprising the redirection code subpart to a redirecting communication device such that the redirecting communication device determines an address of a management device that corresponds with the redirection code of the first message and sends the address of the management device to the communication terminal. The communication terminal sends a second message to a management device via the address of the management device received from the redirecting communication device such that the management device assigns a configuration to the communication terminal such that the communication terminal is configured for accessing a service. The management device is associated with a network hosting the service.

A non-transitory computer readable medium having an application stored thereon that defines instructions for a communication terminal that is performed by the communication terminal when the communication terminal executes the application is also provided. The method defined by the application comprises the communication terminal device receiving input indicating a deployment code for the communication terminal and the communication terminal determining the deployment code based upon the user input. The deployment code comprises a redirection code subpart. The communication terminal sends a first message comprising the redirection code subpart to a redirecting communication device such that the redirecting communication device determines an address of a management device that corresponds with the redirection code of the first message and sends the address of the management device to the communication terminal. The communication terminal sends a second message to a management device via the address of the management device received from the redirecting communication device such that the management device assigns a configuration to the communication terminal such that the communication terminal is configured for accessing a service. The management device is associated with a network hosting the service.

BRIEF DESCRIPTION OF THE DRAWINGS

Present preferred communication systems, communication terminals, and communication devices are shown in the accompanying drawings and certain present preferred methods of practicing or making the same are also illustrated therein. It should be understood that like reference numbers used in the drawings may identify like components.

DETAILED DESCRIPTION OF THE INVENTION

Referring to FIGS. 1-6, the first network 1 includes a redirecting communication device 4 that is communicatively connectable to a first terminal device 7, which is within a second network 3. The first terminal device 7 may be a communication terminal such as a mobile phone, a cellular phone, a tablet, a laptop computer, a desktop computer, a personal computer telephone, an internet appliance, a personal digital assistant, or another type of terminal communication device. The first terminal device 7 may be part of the second network 3 or may be within a subpart of the second network 3 such as a branch network of an enterprise network or may be part of a cellular network or a local area network hat is remote from the first network 1. The cellular network, remote local area network or branch network may be considered a second network 3.

Figure 1:
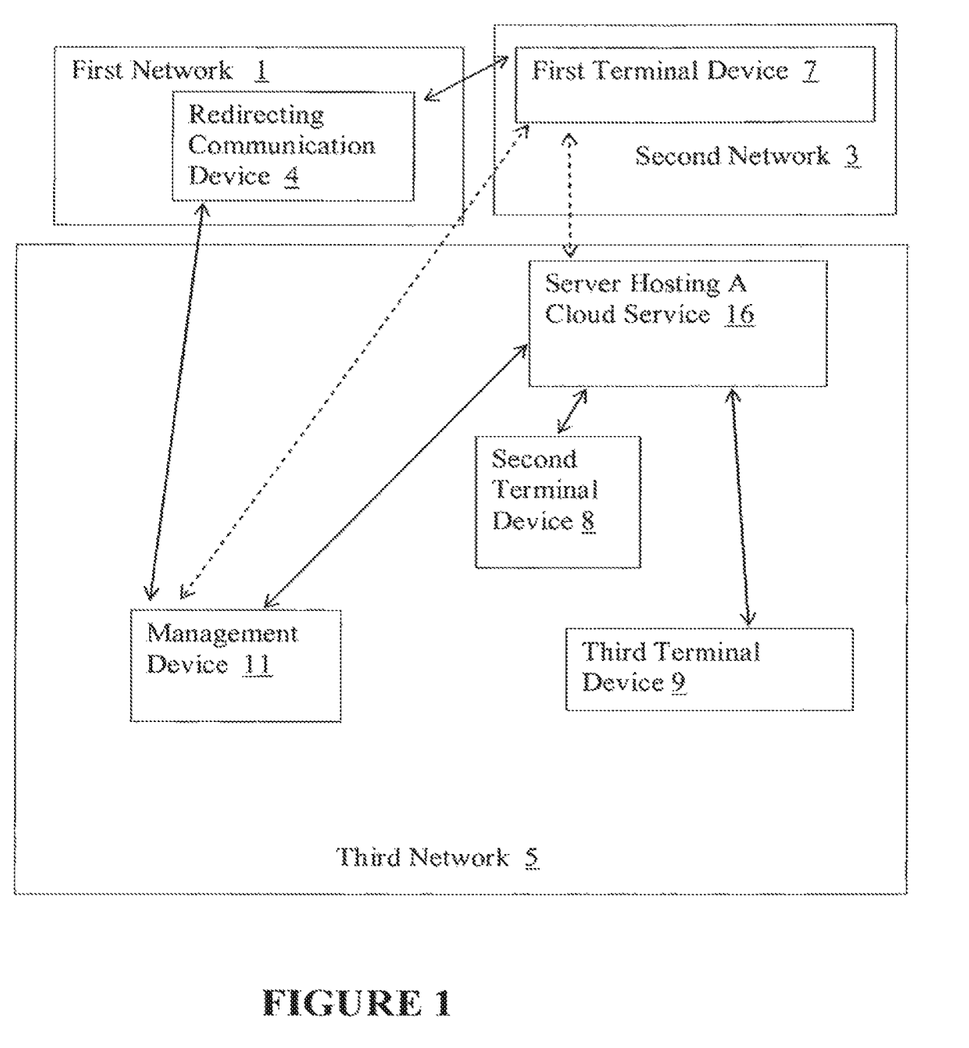
FIG. 1 is a block diagram of an exemplary embodiment of a communication system. Established communication connections between the first terminal device 7 and the management device 11 and the first terminal device 7 and the server hosting a cloud service 16 are shown in broken line.

A third network 5 may be a private network such as an enterprise network hosted by a cloud service entity or other private network. The third network 5 may be communicatively connectable to devices of the first network 1 or second network 3 via the internet or other global network connection. The third network 5 may include a management device 11 that manages and oversees deployment of and registration with the service hosted by the provider of services that maintains the third network, such as a cloud service hosted by a cloud service provider. A separate server that hosts a cloud service 16 may be within the third network 5 and communicatively connected to the management device 11. In alternative embodiments, the management device 11 may also host one or more services in addition to managing and overseeing registration and configuration of terminal devices and other devices that may communicate with the third network 5 to utilize one or more services available via the third network 5.

The third network 5 may also include a second terminal device 8 and a third terminal device 9. The second and third terminal devices 8 and 9 may be terminal devices that are communicatively connected to the second network 3. The second and third terminal devices may be communicatively connected to the server hosting a cloud service 16, for example for utilizing a cloud service.

The redirecting communication device 4 may be located independently of the second network 3 of the first terminal device 7 and the third network 5 of the management device 11. For example, the redirecting communication device 4 may be located independently of a set of devices being deployed for use of cloud services from a cloud service provider network and also be located independently from the cloud service provider network, for example.

Figure 2:
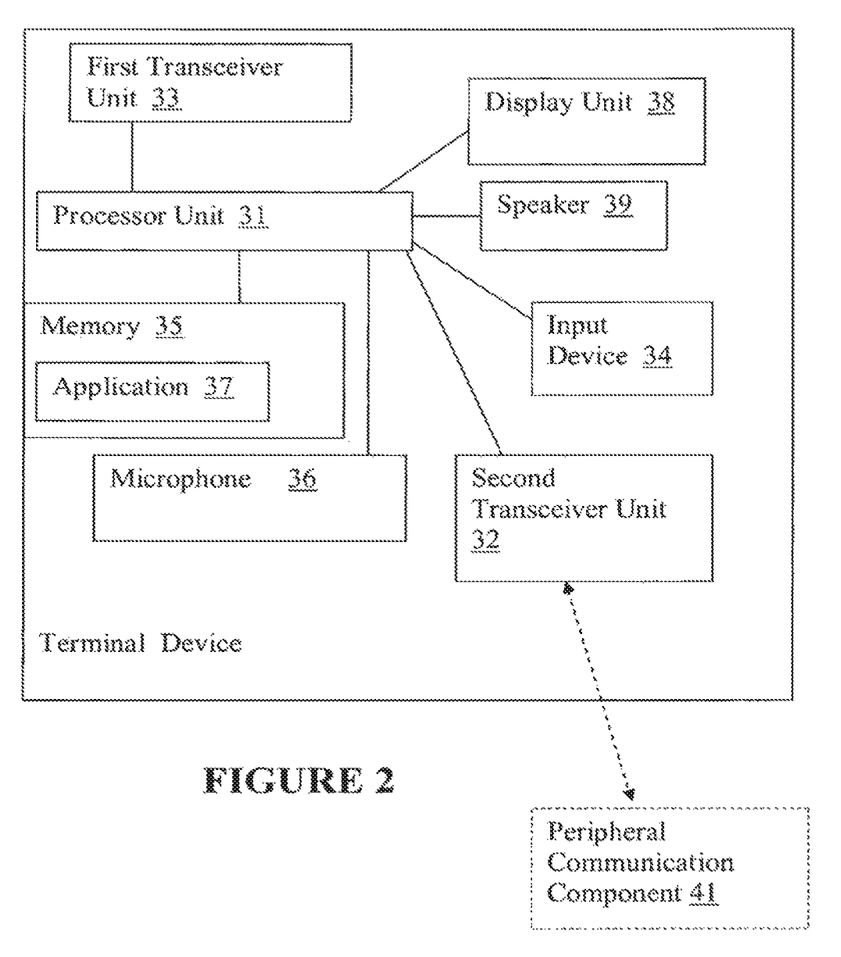
FIG. 2 is a block diagram of an exemplary embodiment of a communication terminal that may be included in embodiments of the communication system such as, for example, the embodiment shown in FIG. 1. An optional peripheral communication component 41 such as a keyboard, remote control, or display, is shown in broken line as well as the connection between the peripheral communication component and the communication terminal.

The first, second and third terminal devices 7, 8 and 9 may each be one of many different types of communication terminals such as a desktop computer, laptop, table, cellular phone, or internet appliance. An example of such a terminal device is shown in FIG. 2. The first, second, and third terminals may each be configured to include a processor unit 31 that is communicatively connected to a first transceiver unit 33, a second transceiver unit 32, an input device 34, a display unit 38, a speaker 39, a microphone 36, and a memory 35. An application 37 may be stored on the memory 35 so that it is executable by the processor unit 31. The processor unit 31 may be a microprocessor, a central processing unit, or interconnected processors that are configured to execute one or more applications stored in the memory 35. The application 37 may be defined by code, which may define a method that is performed when the application is executed by the processor unit 31.

The display unit 38 may be a liquid crystal display that is a touch screen display. The speaker 39 may emit audio and the microphone 36 may record audio from a user as user input or for including in a communication transmission such as a phone call. The input device 34 may include a button, a key, a camera sensor, a keyboard, or other input device that is actuatable by a user to provide input to the terminal device. The input obtained via the input device 34 may be provided for storage in the memory 35, for transmission to another device, or for other purposes. The memory 35 may be flash memory, a hard drive, or other type of non-transitory memory. The first transceiver 33 may include a receiver and transmitter configured for receiving and transmitting data via one or more network connections such as a wired or wireless network connection or a cellular network connection. Data may be transmitted or received by the first transceiver unit 33 of the terminal device via a network connection such as a wireless connection or a connection defined by a path traversing through multiple nodes of multiple networks. It should be understood that such a connection path may include wired portions and wireless portions in addition to intermediate nodes. The second transceiver unit 32 may be configured to permit a near field communication connection such as a Bluetooth wireless connection or other near field wireless connection. The second transceiver unit may alternatively be configured to permit a wired connection to another device such as another computer device or a peripheral device. For instance, a peripheral input or output device such as a display, a camera sensor, a keyboard, or a mouse may be connected as a peripheral communication component 41 to the communication terminal via the second transceiver unit 32.

Figure 3:
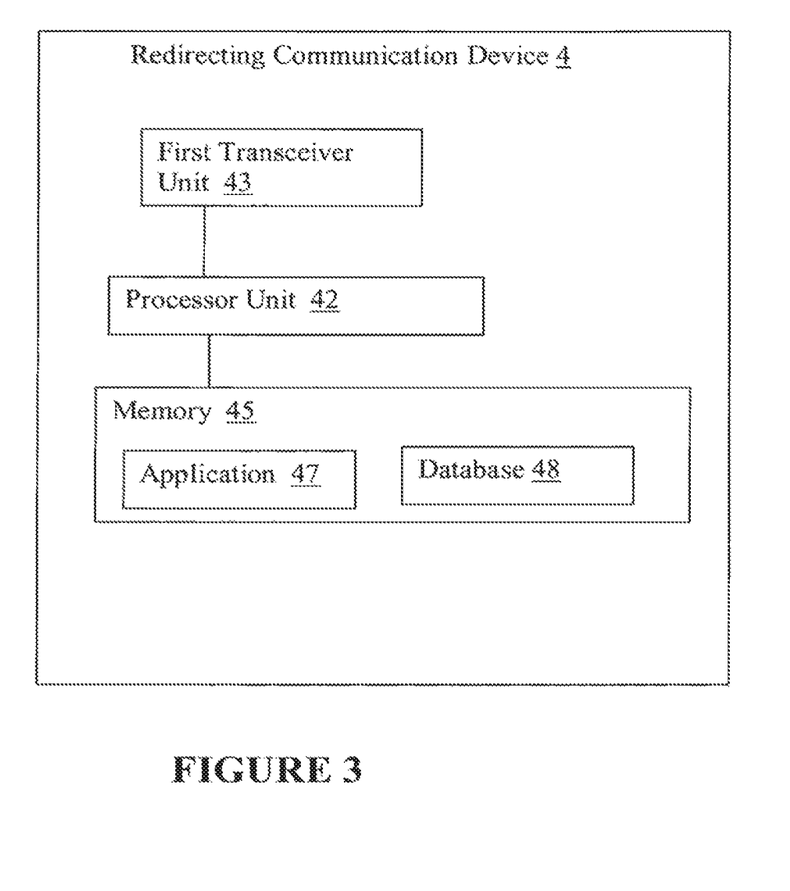
FIG. 3 is a block diagram of an exemplary embodiment of a redirecting communication device that may be utilized in embodiments of the communication system such as, for example, the embodiment shown in FIG. 1.

An example of the redirecting communication device 4 is shown in FIG. 3. The redirecting communication device 4 may be a computer device that includes a processor unit 42 that is communicatively connected to a first transceiver unit 43 so that it can send and receive data and messages such as data packets and other messages to and from other devices such as the first terminal device 7. In some contemplated embodiments such as embodiments that utilize a Media Access Control ("MAC") based deployment, the first transceiver unit 43 may also be configured so that it can send and receive data and messages such as data packets and other messages to and from the management device 11.

Data may be transmitted or received by the first transceiver unit 43 of the redirecting communication device 4 via a network connection such as a wireless connection or a connection defined by a path traversing through multiple nodes of multiple networks. It should be understood that such a connection path may include wired portions and wireless portions in addition to intermediate nodes. The processor unit 42 is also communicatively connected to memory 45, such as a hard drive, flash memory, interconnected memory units, or other non-transitory memory. The memory 45 may include one or more applications that are executed by the processor unit 42 and one or more data sets that contain information such as one or more databases 48 that may be stored in the memory. A database 48 may contain interlinked data such as a table of assigned addresses and redirection reference values or redirection codes that correspond to certain addresses. The database 48 may be used to map redirect codes to management device addresses, for example.

When the processor unit 42 executes an application 47, the redirecting communication device may perform a method defined by the application 47. In some embodiments, the redirecting communication device 4 may be a server, a softswitch, a workstation, or other type of communication device.

Figure 4:
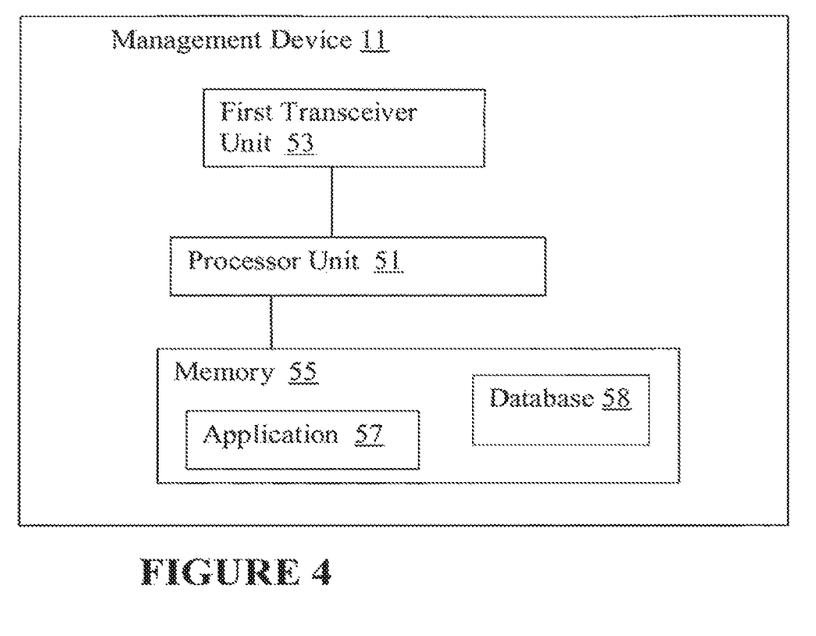
FIG. 4 is block diagram of an exemplary embodiment of a management device that may be utilized in embodiments of the communication system such as, for example, the embodiment shown in FIG. 1.

As may be appreciated from FIG. 4, the management device 11 may be a server or other type of computer device or communication device that may oversee or manage the registration and configuration of terminal devices so that the terminal devices may subsequently utilize services hosted by the third network 5. The management device 11 may include a processor unit 51 that is communicatively connected to a first transceiver unit 53 and memory 55. The first transceiver unit 53 may include a receiver and transmitter for exchanging data with other devices connected to the management device such as a terminal device via a network connection such as a wireless connection or a connection defined by a path traversing through multiple nodes of multiple networks. In some embodiments, such as embodiments utilizing a MAC based deployment, the first transceiver unit 53 may also be configured to exchange data with the redirecting communication device 4 via a network connection.

It should be understood that such a connection path may include wired portions and wireless portions in addition to intermediate nodes. The memory 55 of the management device 11 may be non-transitory and may have at least one application 57 stored thereon as well as at least one database 58. The application may define a method that is performed by the management device 11 when the application is executed or run by the processor unit 53.

The database 58 may be used to recognize a terminal device connected to it and to identify, and provide, the configuration data required by the terminal device. The database 58 may also be updated to include information about terminal devices registered with the device that is linked to device identification data such as a deployment reference part or deployment reference code, addresses of the terminal devices, users associated with the terminal devices, authorization levels assigned to each user or to each terminal device, or other information.

Figure 5:
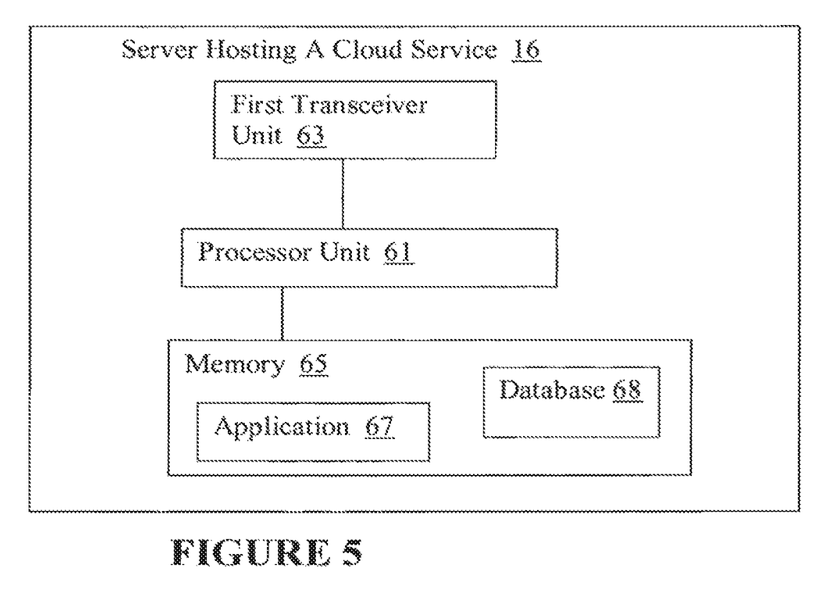
FIG. 5 is a block diagram of an exemplary embodiment of a server that hosts a cloud service that may be utilized in embodiments of the communication system such as, for example, the embodiment shown in FIG. 1.

As may be understood from FIG. 5, the server hosting a cloud service 16 may be a computer device such as server or a workstation configured to function as a server. The server hosting the cloud service 16 may host one or more cloud services such as internet protocol ("IP") telephony services or one or more other services. The server hosting a cloud service 16 may include a first transceiver 63 communicatively connected to a processor unit 61. The processor unit 61 may be connected to non-transitory memory 65, which may have at least one database 68 and at least one application 67 stored thereon. The first transceiver unit 63 may include a receiver and transmitter for exchanging data with other devices connected to the server hosting the service 16 such as a terminal device or optionally the management device 11 via a network connection such as a wireless connection or a connection defined by a path traversing through multiple nodes of multiple networks. It should be understood that such a connection path may include wired portions and wireless portions in addition to intermediate nodes. The application may define a method that is performed by the server hosting the cloud service 16 when the application is executed or run by the processor unit 63. The database 68 may contain a collection of data that may be accessed by the processor unit 61 to respond to queries or other types of messages transmitted by different terminal devices or that associates information related to different services being rendered to different devices.

The first terminal device 7 may be provided to a user such as an employee of a business that utilizes one or more cloud service vendors for certain communication services. The first terminal device 7 may be supplied with stock factory settings that include detecting conditions required for cloud deployment. The employee may also be provided with a deployment code or another code that may be used to determine a deployment code. The deployment code or code used to indicate a deployment code may be provided to the employee in an email, a written letter such as a written memorandum, a text message sent to the employee, audibly, or in another format. The employee may then turn on the first terminal device 7. The first terminal device 7 may be configured to automatically detect when to register with a cloud service provider upon detecting certain predefined requirements being met or may do so upon receipt of user input actuating the registration process. For example, the first terminal device 7 may determine that it does not have the address of a management device or of a service provider but that a domain name system, such as a domain name server (not shown) is available to convert a fully qualified domain name assigned to the first terminal device to one or more internet protocol addresses or other addresses for assigning to the terminal device so that the first terminal device may select an address to contact the redirecting communication device 4. It should be understood that the use of a domain name system can permit an address of the redirecting communication device to be changed without requiring changes to the software of the first terminal device.

Additionally, the first terminal device may detect that the first terminal device 7 has not yet acquired an address such that the user is prompted via a pressable icon or other message displayed on the display unit of the terminal device or otherwise emitted by the terminal device to initiate a process for configuring the first terminal device to utilize a service offered by the third network 5. If prompted for input to initiate the configuration process, the user may then provide that input to initiate the registration process. The first terminal device may then utilize the domain name system as noted above or may utilize an address specifically defined within the terminal to contact the redirecting communication device 4.

Figure 7:
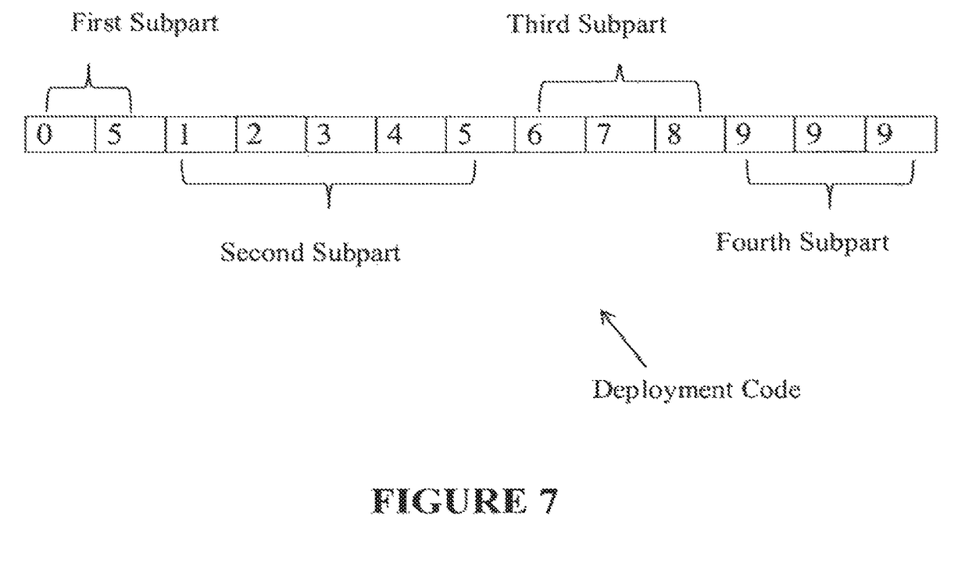
FIG. 7 is a block diagram illustrating an exemplary embodiment of a deployment code.

During the registration process or in response to a prompt for initiating the registration process, the terminal device may request that the user enter as input the deployment code previously provided to the user. The user may then use an input device or touch the display unit that may function as a touch screen display as needed to provide input that identifies the deployment code. One example of a deployment code is shown in FIG. 7, which provides an illustration of a string of characters "0512345678999" that may represent a deployment code. Such a string of characters may include a first subpart that functions as a count that identifies the length of the redirect code. The count may be predefined as, for example, the value of the first two characters. In the above noted example, the count would therefore be "05", which is the value of five. A second subpart of the deployment code may be a redirection code, which is the subsequent five characters as defined by the count in the first subpart within the series of characters of the deployment code, which would be "12345" portion of the deployment code 0512345678999. A third subpart of the deployment code may define a deployment reference number. The third subpart may be a predefined number of characters, such as a predefined number of characters in series that are present after the last character of the redirection code o0r an undefined number of characters which start after the last character of the redirection code and end before the pre-defined length of the fourth subpart. The deployment reference number for the deployment code 0512345678999 may be the three characters that are in series after the "5" of the "12345" redirection code, which is the characters "678" of the deployment code. The final characters may be a predefined length fourth subpart of the deployment code and may be a checksum or a hash that is usable for validating the deployment code as entered by the user. Alternatively, the fourth subpart could be taken as the characters remaining in the deployment code after the deployment reference number when the length of the deployment reference number is predefined. For the above example of 0512345678999, the fourth subpart may be the checksum of "999".

It should be understood that the string of characters may include letters or symbols that may represent different values or correspond to different values for different embodiments. For instance, the value "E" may be used as the first subpart of a deployment code and identify a count for the redirection code as being the five characters that are present after the "E" in series. As another example, the deployment code may include one or more characters that may be symbols such as an exclamation mark ("!") or series of symbols such as "+=@" to represent a particular number, value, or piece of information.

The first terminal device 7 may be configured to prevent bulk attacks or guesses of a deployment code. For instance, the first terminal device may shut itself off or restart upon an invalid entry being supplied a predetermined number of times.

The first terminal device 7 may send a first message to the redirecting communication device 4. The first message may include the deployment code entered or otherwise indicated by the user of the terminal device in response to the prompt for such input made by the terminal device. For instance, the first message may include the deployment code as entered by a user via user input or may include the deployment code that the first terminal device determines to correspond with a personal identification code entered as user input by a user.

Figure 6:
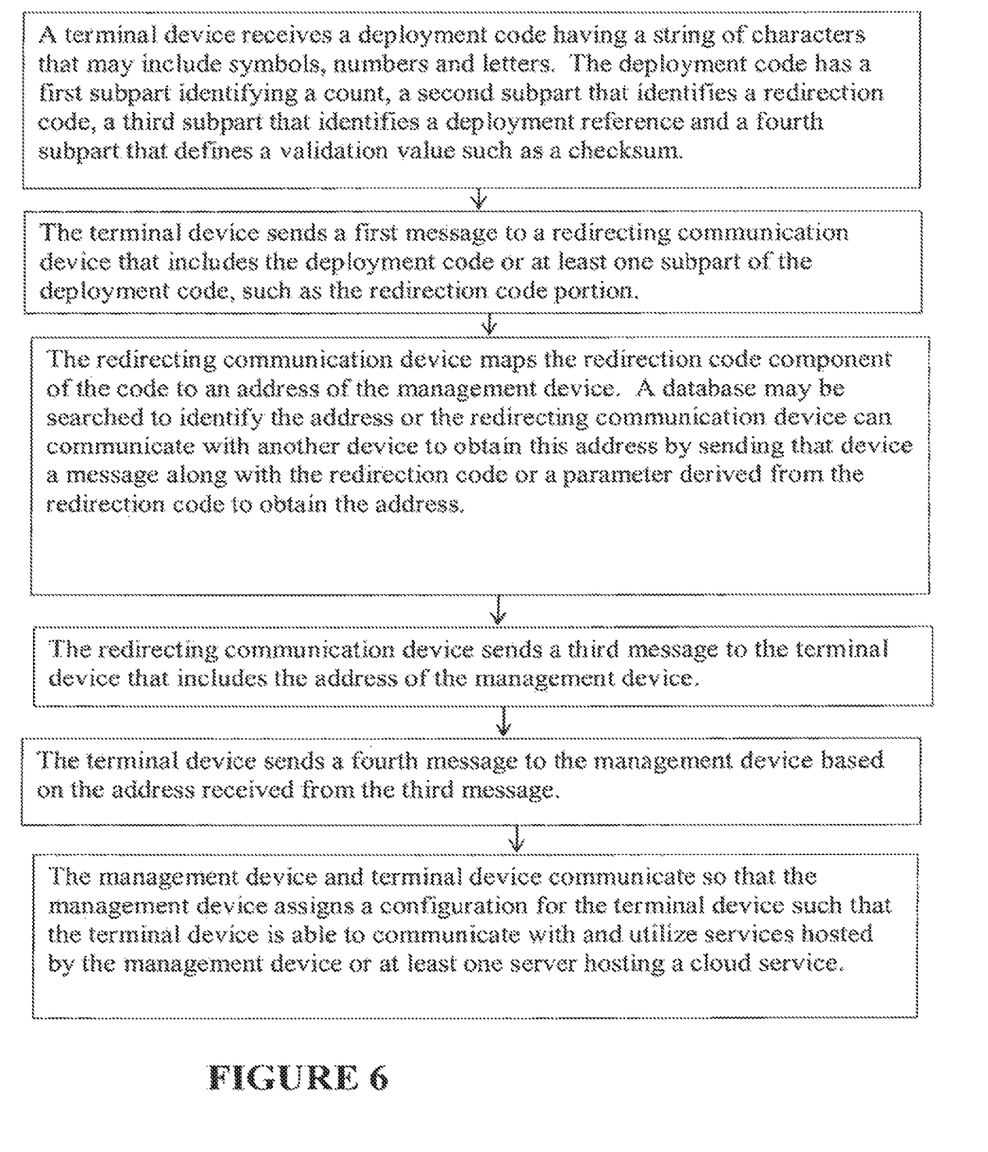
FIG. 6 is a flow chart illustrating an exemplary embodiment of a method for configuration a terminal to use a service such as, for example, a cloud service.

In yet other alternative embodiments, the first terminal device may send a first message but not include the full deployment code for security purposes. Instead, only a redirection code portion of the deployment code may be included in the first message as this information may be the only information needed by the redirecting communication device to perform a redirecting function as shown in FIG. 6 and discussed more fully below. The sending of only the redirection code, or second subpart of the deployment code, may limit the exposure such other information may have to being taken via an attack by a malicious third party.

Prior to the first terminal device 7 sending the first message, it may authenticate the redirecting communication device 4. For instance, the redirecting communication device 4 may be located in a public network and not be immediately determined to be a trustworthy source of information. The first terminal device may include a built in Root Certificate Authority certificate provided by a trusted provider that can be used to authenticate a certificate sent to it by the redirecting communication terminal. The first terminal device may verify that the certificate received from the redirecting communication device 4 corresponds to its own built in certificate. A public key and algorithm defined by the built in Root Certificate Authority certificate can be used to decrypt a signature of the certificate received from the redirecting communication device 4 or other portion of this certificate to authenticate the redirecting communication device. The first terminal device 7 may also check the certificate received from the redirecting communication device to ensure it has a correct identity according to a predefined parameter, such as the address of the redirecting communication device, timestamp and usage.

The first terminal device may also communicate with an online certificate status protocol server (not shown) to verify the status of the certificate received from the redirecting communication device 4 is still valid. The certificate received from the redirecting communication device 4 may include the address of such a server for contacting that server to verify the certificate is still valid and has not yet been revoked. In the event the address provided by the certificate from the redirecting communication device fails to permit a connection to the online certificate status protocol server or this server fails to respond to any message from the first terminal device, the first terminal device may not authenticate the redirecting communication device 4. If the online certificate status protocol server responds to the first terminal device and fails to indicate that the certificate has not been revoked, the first terminal device may be configured to construe this as a rejection of the certificate provided by the redirecting communication device.

In the event the certificate authority built into the software stored as part of the application of the first terminal device needs to be updated or changed, the redirecting communication device 4 may also need to be updated to support the updated certificate information. The new information may include a replacement certificate for use in authenticating the redirecting communication device. The redirecting communication device may also need a new or additional certificate for responding to terminal devices having the updated software or updated certificate and a new address for the redirecting communication device 4. Such updating can be configured to permit the redirecting communication device to still utilize prior certificates for responding to terminal devices using older versions of the software in some situations.

The redirecting communication device 4 receives the first message and the redirection code portion, or second subpart, of the deployment code included within the first message. In response to the received first message, the redirecting communication device 4 uses the redirect code to select the cloud service provider's management device 11 that is appropriate for the first terminal device 7. For example, the redirecting communication device 4 maps the redirection code portion or second subpart to an address of the management device 11, which may be a deployment server for example. The redirecting communication device 4 subsequently sends a second message to the first terminal device 7 that includes the address of the management device 11. The address so provided may be in the form of a domain name that can be converted to one or more IP addresses or other direct addressing forms by a domain name server or the address so provided may be directly provided as an IP address or other direct addressing form.

In some embodiments, the address of the management device that is determined by the redirecting communication device may also be determined based upon a language in which the first terminal device is to be configured (e.g. English, Spanish, German, etc.). The language for the configuration of the device may be indicated by the particular redirection code portion of the first message and may be returned to the first terminal device 7 as an optional part of the second message.

In response to receiving the second message, the first terminal device 7 sends a third message to the management device 11 using the address of the management device 11 received from the redirecting communication device 4. The third message may include the full deployment code or at least one subpart of the deployment code, such as the third subpart. The management device 11 may receive that third message and verify that the deployment code or the third subpart of the deployment code is a valid code for the first terminal device. The management device 11 may also respond to the third message by exchanging communications with the first terminal device 7 to configure the first terminal device 7 upon a determination that the third subpart of the deployment code or the full deployment code is valid. The configuration process for the first terminal device 7 may be controlled by the management device 11 based on the information provided in the third message. In an alternative embodiment, the management device 11 may use some other means to recognize the first terminal device 7 prior to initiating the configuration process (e.g. recognition by MAC address).

The configuration process may result in the first terminal device 7 being assigned a particular address for use in communications with the third network 5 by the management device 11. The configuration may also configure the first terminal device in other ways based upon information included within the deployment code. For instance, the deployment reference portion of the deployment code, or third subpart of the deployment code, may define the authority or approvals to be assigned to the first terminal device 7. Such approvals and authority may limit the amount of access to different cloud services that can be provided to the user of the first terminal device 7 or may identify a charge schema to be utilized for the first terminal device 7 to access different services offered by the third network 5. The approvals and authority identified in the deployment reference portion of the deployment code that is used to configure the first terminal device 7 may result in the first terminal device having a limited approval parameter that does not permit the first terminal device 7 to communicate with one or more servers of the third network 5, for example, when the user of the first terminal device 7 is logged in for use of that device for accessing the third network 5.

The deployment reference portion, or third subpart, of the deployment code may also be used by the management device 11 to determine whether any applications are to be downloaded by the first terminal device 7 for use in accessing one or more servers of the third network 5. Such applications may be transmitted by the management device 11 or by the management device 11 communicating with another server to have the applications transmitted to the first terminal device 7 so that the device may subsequently install the applications.

In alternative embodiments, a service such as a cloud service may be deployed using a Media Access Control ("MAC") address based system. For such embodiments, the management device 11 may include a database that links different terminal devices to a specific MAC address. When the first terminal device 7 sends a first message to the redirecting communication device 4, the MAC address of the first terminal device 7 may be included instead of a deployment code or portion of a deployment code. The MAC address may function as a key that the redirecting communication device 4 utilizes to map the address of the management device 11 to determine the address of the management device 11 for the first terminal device 7. Alternatively, the redirecting communication device 4 may query each possible management device to determine one that recognizes the MAC address of the first terminal device 7 and returns the address of the matching management device 11 to the first terminal device 7 in the second message. The redirecting communication device 4 may then send the second message with the determined address of the management device 11 to the first terminal device 7. The first terminal device 7 may then send a third message to the management device 11 using the received address for this device. The third message may include the deployment code. For the MAC address embodiment, the MAC address of the first terminal device 7 is also sent to the management device 11. The management device 11 may then configure the first terminal device 7 similarly to the configuration process discussed above.

After the first terminal device is configured via the management device 11, the first terminal device 7 may communicate with a server hosting a cloud service 16 of the third network 5. That communications with this server may include establishing communications with other terminal devices such as the second or third terminal devices 8 and 9 via the server that hosts the cloud service 16. While only one server is illustrated, it should be understood that multiple different servers hosting different services may all be accessible to the first terminal via the configuration of the first terminal depending on the services offered by the third network 5 and the approval or authorization level assigned to the first terminal device 7 during the configuration process.

It should be appreciated that embodiments of our method permit the use of an easily entered code by a user that can be used to determine a code for determining an address to a management device of a network so that a device may be configured for use of services offered by that network. The language used on the terminal device may be defined by the code as well. Embodiments of the method and system can permit a means to ensure that a length of a code entered by a user is minimized while still permitting a variable and large number of different codes that can support a large population of customers to a cloud service provider or other network provider. The different codes can also be allocated to different customer groups and can permit compromised codes to be more easily made obsolete to address such security risks.

Embodiments of our method and system therefore provide a number of advantages in terms of flexibility, improved deployment and management of a network, and also permits a reduction in costs associated with the management and maintenance of such a network and the deployment of services offered by that network. Embodiments of our method and system also permit a means to update the security mechanism for new devices being developed or later sold while retaining a deployment capability of previously distributed devices.

It should also be understood that the redirecting communication device 4 may be considered a redirecting communication device because it provides an address of another device that the first terminal device 7 may contact for being configured or for registering with a service. By performing such a function, the redirecting communication device can be considered to redirect the first terminal device 7 to the management device 11.

It should be appreciated that there are a number of variations that may be made to the embodiments of our communication terminal, communication system, and methods of making and using the same discussed above. For instance, the communication terminal may be a tablet, personal computer telephone, desktop telephone, cellular phone, laptop computer, personal digital assistant, or other mobile computer device. The redirecting communication device 4 may be a server or may be a router, other access point or computer device that utilizes a processor that is communicatively coupled to memory that has a redirect application stored thereon that is executed by the device. As yet another example, the management device 11 may be a server or other computer device that communicates with a terminal to configure the terminal so that it is able to access at least a portion of the service provided via the network. In some embodiments, the management device may also offer or host one or more services that are available to a terminal that is registered with that device after the configuration process. As yet another example, one or more input devices and one or more output devices may be operatively connected or communicatively connected to the redirecting communication device 4, management device 11, or server hosting a cloud service 16.

While certain present preferred embodiments of the communication terminal, communication system, and methods of making and using the same have been shown and described above, it is to be distinctly understood that the invention is not limited thereto but may be otherwise variously embodied and practiced within the scope of the following claims.

What is claimed is:

1. A method of configuring a communication terminal comprising:
    the communication terminal receiving input indicating a deployment code for the communication terminal;
    the communication terminal determining a deployment reference identifier for the deployment code or the deployment code based upon the input;
    the communication terminal sending a first message comprising a redirection code to a redirecting communication device such that an address of a management device corresponding with the redirection code of the first message is determinable by the redirecting communication device so the address of the management device is sendable by the redirecting communication device to the communication terminal; and
    the communication terminal sending a second message to the management device via the address of the management device received from the redirecting communication device such that the management device assigns a configuration to the communication terminal such that the communication terminal is configured for accessing a service associated with the management device, wherein the second message comprises the deployment reference identifier for the deployment code or the deployment code.

2. The method of claim 1, comprising the management device receiving the second message, the management device being associated with a first network hosting a service.

3. The method of claim 2, comprising the redirecting communication device receiving the first message; and wherein the communication terminal is in a second network and the redirecting communication device is in a third network.

4. The method of claim 1, wherein the deployment code comprises:
    a first subpart that is comprised of a string of at least one character configured to function as a count identifying a length of the redirection code;
    a second subpart comprised of a number of characters defined by the length identified via the count of the first subpart, the number of characters of the second subpart defining a redirection code of the redirection code subpart; and
    a third subpart comprised of a number of characters defining the deployment reference identifier for the deployment code.

5. The method of claim 1, wherein the deployment code is comprised of a series of characters, the series of characters comprising a first subpart of the characters and a second subpart of the characters, the first subpart of the characters being a redirection reference portion of the deployment code and the second subpart of the characters being a deployment reference portion of the deployment code.

6. The method of claim 5 wherein the deployment code is comprised of a third subpart of the characters having at least one character that identifies a number of characters sequentially after the third subpart that defines a number of characters within the redirection reference portion of the deployment code, the third subpart of the characters being positioned sequentially before the first subpart of the characters.

7. The method of claim 4, wherein the deployment code is also comprised of a fourth subpart, the fourth subpart is a checksum, wherein the deployment code is configured such that the first subpart is arranged sequentially before the second subpart, the second subpart is arranged sequentially after the first subpart and before the third subpart, and the third subpart is arranged sequentially after the second subpart and before the fourth subpart.

8. The method of claim 7, wherein the input is first input and the checksum is identified by a second input entered by a user of the communication terminal to validate the deployment code.

9. The method of claim 1, further comprising the communication terminal forming a communication connection with a server hosting a cloud service after having the configuration assigned by the management device and after the communication terminal is configured via the assigned configuration.

10. A communication terminal comprising:
    a non-transitory computer readable medium having an application; and
    a processor unit communicatively connected to the non-transitory computer readable medium, the application being executable by the processor unit such that the communication terminal is configured to:
    determine a deployment code or a deployment reference identifier for the deployment code via input received by the communication terminal indicating the deployment code for the communication terminal;
    send a first message comprising a redirection code to a redirecting communication device to which the communication terminal is communicatively connectable such that an address of a management device corresponding with the redirection code of the first message is determinable by the redirecting communication device so the address of the management device is sendable by the redirecting communication device to the communication terminal; and
    send a second message to the management device via the address of the management device received from the redirecting communication device such that the management device assigns a configuration to the communication terminal such that the communication terminal is configurable for accessing a service associated with the management device, wherein the second message comprises the deployment reference identifier for the deployment code or the deployment code.

11. The communication terminal of claim 10, wherein the deployment code comprises:
   a first subpart comprised of a string of at least one character configured to function as a count that identifies a length of the redirection code;
   a second subpart comprised of a number of characters defined by the length identified via the count of the first subpart, the number of characters of the second subpart defining the redirection code; and
   a third subpart comprised of a number of characters defining the deployment reference identifier for the deployment code.

12. The communication terminal of claim 10, wherein the deployment code is also comprised of a fourth subpart, the fourth subpart is a checksum, wherein the deployment code is configured such that the first subpart is arranged sequentially before the second subpart, the second subpart is arranged sequentially after the first subpart and before the third subpart, and the third subpart is arranged sequentially after the second subpart and before the fourth subpart.

13. The communication terminal of claim 10, wherein the deployment code is comprised of a series of characters, the series of characters comprising a first subpart of the characters and a second subpart of the characters, the first subpart of the characters being a redirection reference portion of the deployment code and the second subpart of the characters being a deployment reference portion of the deployment code.

14. The communication terminal of claim 13, wherein the deployment code is comprised of a third subpart of the characters having at least one character identifying a number of characters sequentially after the third subpart that defines a number of characters within the redirection reference portion of the deployment code, the third subpart of the characters being positioned sequentially before the first subpart of the characters.

15. A communication apparatus, comprising:
   a first terminal device;
   the first terminal device configured to receive input indicating a deployment code for the first terminal device;
   the first terminal device configured to determine the deployment code based upon the input, the deployment code comprising a redirection code subpart;
   the first terminal device configured to send a first message to a redirecting communication device, the first message comprising the redirection code subpart, the first message configured to cause the redirecting communication device to respond to the first message by sending a second message to the first terminal device;
   the first terminal device configured to respond to the second message received from the redirecting communication device by sending a third message to a management device via an address of the management device received from the second message, the third message configured to cause the management device to respond to the third message to facilitate configuration of the first terminal device; and
   wherein the third message is comprised of a deployment reference portion of the deployment code and wherein the configuration assigned to the first terminal device is the configuration identified by the deployment reference portion of the deployment code.

16. The apparatus of claim 15, comprising:
   the redirecting communication device, the redirecting communication device communicatively connectable to the first terminal device, the redirecting communication device configured to respond to the first message by determining the address of the management device corresponding with the redirection code subpart of the first message and send a second message to the first terminal device, the second message comprising at least one of a language to be used by the first terminal device and the address of the management device.

17. The apparatus of claim 15, comprising:
   the management device communicatively connectable to the first terminal device, the management device configured to respond to the third message by establishing a communication with the first terminal device to assign a configuration for the first terminal device.

18. The apparatus of claim 17, comprising:
   the redirecting communication device, the redirecting communication device communicatively connectable to the first terminal device, the redirecting communication device configured to respond to the first message by determining the address of the management device corresponding that with the redirection code subpart of the first message and send a second message to the first terminal device, the second message comprising at least one of a language to be used by the first terminal device and the address of the management device; and
   wherein the management device is in a first network, the first terminal device is in a second network and the redirecting communication device is in a third network.

19. The apparatus of claim 15, wherein:
   the deployment reference portion of the deployment code is comprised of an entirety of the deployment code; or
   the deployment reference portion of the deployment code is comprised of:
      a first subpart comprised of a string of at least one character configured to function as a count identifying a length of a redirection code;
      a second subpart comprised of a number of characters defined by the length identified via the count of the first subpart, the number of characters of the second subpart defining a redirection code of the redirection code subpart; and
      a third subpart comprised of a number of characters defining a deployment reference identifier for the deployment code.

20. The apparatus of claim 19, wherein the deployment code is also comprised of a fourth subpart, the fourth subpart is a checksum, wherein the deployment code is configured such that the first subpart is arranged sequentially before the second subpart, the second subpart is arranged sequentially after the first subpart and before the third subpart, and the third subpart is arranged sequentially after the second subpart and before the fourth subpart.

* * * * *